United States Patent
Bayer et al.

(10) Patent No.: US 7,964,086 B2
(45) Date of Patent: Jun. 21, 2011

(54) ELECTRODE AND METHOD FOR ELECTROCHEMICALLY MACHINING A WORKPIECE

(75) Inventors: Erwin Bayer, Dachau (DE); Harald Geiger, Gaildorf (DE); Jochen Laun, Gaildorf (DE); Martin Bussmann, Schwabhausen (DE); Thomas Kraenzler, Salem (DE); Albin Platz, Ried-Baindlkirch (DE); Walter Rothammel, Kressberg/Bergbronn (DE); Martin Stroeer, Immenstaad (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 1462 days.

(21) Appl. No.: 11/207,548

(22) Filed: Aug. 19, 2005

(65) Prior Publication Data
US 2006/0081481 A1 Apr. 20, 2006

(30) Foreign Application Priority Data
Aug. 19, 2004 (DE) .......................... 10 2004 040 216

(51) Int. Cl.
*B23H 9/10* (2006.01)
(52) U.S. Cl. ........................................ 205/653; 205/649
(58) Field of Classification Search ................... 205/653, 205/649
See application file for complete search history.

(56) References Cited

U.S. PATENT DOCUMENTS

| | | | |
|---|---|---|---|
| 3,041,265 A | 6/1962 | Williams | |
| 3,202,595 A | 8/1965 | Inoue | |
| 3,271,281 A | 9/1966 | Brown et al. | |
| 3,567,604 A | 3/1971 | Bodine | |
| 4,152,570 A | 5/1979 | Inoue et al. | |
| 4,522,692 A | 6/1985 | Joslin | |
| 7,462,273 B2 * | 12/2008 | Mielke | 205/651 |
| 2002/0169516 A1 * | 11/2002 | Brussee et al. | 700/162 |
| 2005/0274625 A1 * | 12/2005 | Joslin | 205/640 |

FOREIGN PATENT DOCUMENTS
DE 1 933 455 3/1970

* cited by examiner

*Primary Examiner* — Alexa D. Neckel
*Assistant Examiner* — Nicholas A. Smith
(74) *Attorney, Agent, or Firm* — Crowell & Moring LLP

(57) ABSTRACT

An electrode and method for the electrochemical machining of a workpiece is disclosed. The electrode is designed as a cathodically polarized tool electrode. It has a geometry that corresponds to the geometry to be removed from the workpiece, at least in a machining range, and perviousnesses in the electrode to allow an electrolyte to flow through and exit at the electrode surface, at least in the area of the machining range. The perviousnesses are formed by a porous design of the electrode and/or by artificially created openings in the electrode or the electrode surface. The porosity distribution and/or the number, arrangement and configuration of the openings is selected such that a uniform electrolyte flow and/or electrolyte exchange at the electrode surface is ensured at least in the machining range of the electrode.

3 Claims, 1 Drawing Sheet

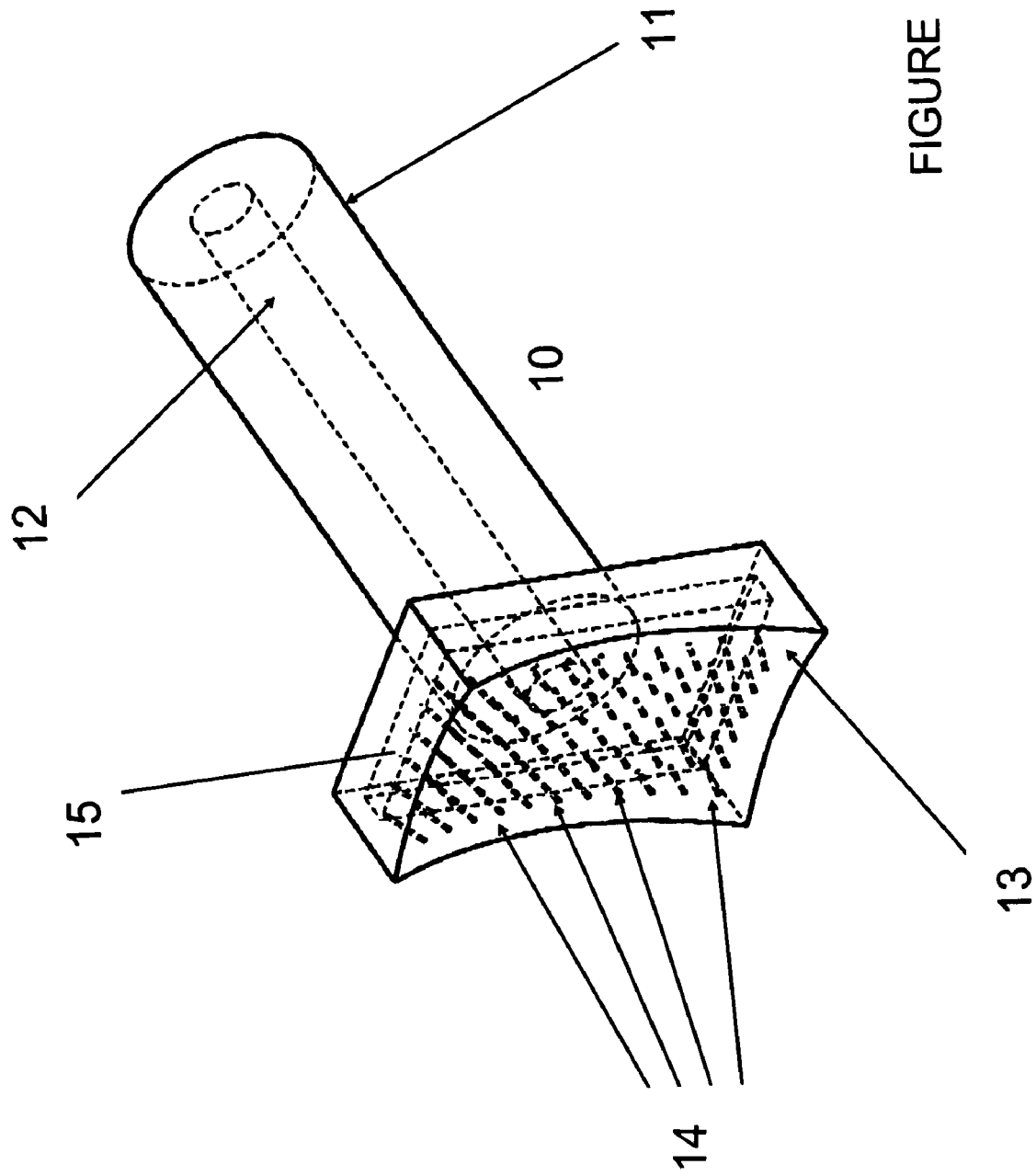
FIGURE

ELECTRODE AND METHOD FOR ELECTROCHEMICALLY MACHINING A WORKPIECE

This application claims the priority of German Patent Document No. 10 2004 040 216.7, filed Aug. 19, 2004, the disclosure of which is expressly incorporated by reference herein.

BACKGROUND AND SUMMARY OF THE INVENTION

The present invention relates to an electrode for electrochemically machining a workpiece. The electrode is a cathodically polarized tool electrode. It has a geometry that corresponds to the geometry to be removed on the workpiece, at least in a machining range, and perviousnesses within the electrode that allows an electrolyte to flow through and exit at the electrode surface, at least in the area of the machining range. The invention further relates to a method for electrochemically machining a workpiece with an electrode and to uses for the electrode according to the invention.

A wide variety of electrodes for electrochemical machining of a workpiece are known in the art. For example, U.S. Pat. No. 4,522,692 discloses an electrode of the aforementioned type. The electrode is constructed of a plurality of elements, namely an electrode body and a porous electrode tip or a porous electrode end. The electrode tip or electrode end is made of a sintered metal powder. A drawback of the known electrodes, however, is that they are not capable of ensuring a uniform electrolyte flow or a uniform and sufficient electrolyte exchange.

Methods for electrochemical machining of a workpiece using an electrode are also known in the art. Electrochemical machining is a method for the exact and highly precise machining of surfaces. With electrochemical machining the surface of the workpiece is usually machined by an electrode, such that an electrochemical reaction of the workpiece and the electrolyte between the workpiece and the electrode causes material to be removed from the workpiece. In typical electrochemical machining processes, the distances between the electrodes and the workpiece range from 1 to 2 mm. To produce finer structures and shapes, this distance may be reduced to the order of 10 to 50 µm and less (precision electrochemical machining). With such precise electrochemical machining, an exchange of the electrolyte can be ensured only through vibration of the electrode and correspondingly high electrolyte pressures in the gap between the electrode and the workpiece. However, this involves the risk, particularly with thin-walled workpieces, that the workpiece will be damaged and, in particular, warped. Furthermore, while the gap is opened by vibration, the flow of current is interrupted to prevent uncontrolled and uneven removal. This reduces the removal rate.

Thus, it is an object of the present invention to provide an electrode of the above-described type, which ensures uniform electrolyte flow and uniform and sufficient electrolyte exchange in an area between the electrode and a workpiece to be machined as well as high removal rates.

It is a further object of the present invention to provide methods for electrochemical machining of a workpiece using an electrode, which ensure a uniform electrolyte flow and uniform and sufficient electrolyte exchange in an area between the electrode and a workpiece to be machined as well as high removal rates.

BRIEF DESCRIPTION OF THE DRAWING

FIGURE illustrates an exemplary electrode in accordance with an embodiment of the invention.

DETAILED DESCRIPTION OF THE EXEMPLARY EMBODIMENTS

FIGURE shows an electrode 10 with a mounting 11 and a flow channel 12 that allows an electrolyte to flow through the electrode 10. Flow channel 12 is hydraulically in contact with chamber 15, where the electrolyte is dispensed into many openings 14. In this embodiment, the openings 14 are arranged in the machining range 13 of the electrode 10, so that electrolyte flow is possible through channel 12, chamber 15 and openings 14 to the machining range 13. It is also possible to substitute openings 14 through a porous electrode.

An electrode for electrochemically machining a workpiece according to the invention has perviousnesses that are formed by a porous design of the electrode and/or by artificially created openings in the electrode or the electrode surface. The porosity distribution and/or the number, arrangement and configuration of the openings is furthermore selected such that a uniform electrolyte flow and/or electrolyte exchange at the electrode surface is ensured at least in a machining range of the electrode. In particular, it is also provided that the porosity distribution and/or the number, arrangement and configuration of the openings are selected to ensure a uniform electrolyte flow and/or electrolyte exchange over the entire electrode surface. The advantageous introduction of a defined porosity distribution or a corresponding pattern of openings makes it possible to force a uniform electrolyte flow and a sufficiently large electrolyte exchange in the narrow gaps required for precise electrochemical machining in order to obtain optimal removal. Compared to a working method with a vibrating or pulsating electrode, the electrode according to the invention makes it possible to significantly reduce or in some cases entirely eliminate pulsating or vibrating in precision electrochemical machining. This increases the ON-period of the working current while maintaining the same machining quality, such that the removal rate is clearly increased, particularly more than doubled.

In one advantageous embodiment of the electrode according to the invention, the electrode surface has areas of different porosities. The openings may also have identical or different diameters and/or identical or different depths. By introducing a defined varying porosity and/or a defined pattern of openings, such as holes, for example, which differ in number, size and depth, a forced uniform electrolyte flow can be adjusted even in precision electrochemical machining. This, in turn, results in an optimal removal with optimal surface characteristics of the workpiece to be machined.

In another advantageous embodiment of the electrode according to the invention, areas with different pressure gradients are formed through the configuration of the perviousnesses in the electrode. It is possible, for example, to obtain different pressure gradients, inter alia, by different wall thicknesses of the electrode. It is also possible to create the different pressure gradients by separately produced supply pressures. The predefined and adjusted pressure distribution makes it possible to produce a uniform electrolyte flow or electrolyte exchange in precision electrochemical machining even with narrow gaps. The porosity distribution and/or the number, arrangement and configuration of the openings and/or the distribution of the pressure gradients in the electrode are advantageously determined in advance by computer simulation. This makes it possible to adapt an optimal uniform electrolyte flow and electrolyte exchange to the respective geometry of the electrode or the tool electrode.

In yet another advantageous embodiment of the invention, the electrode is made of graphite, metal or a metal alloy, preferably a tungsten copper alloy.

A method according to the invention for electrochemically machining a workpiece using an electrochemical machining process with an electrode as described above is characterized in that at least one micromovement of the electrode is executed perpendicular to the feed direction of the electrode while the electrode is fed in the direction of the workpiece to be machined. The use of the above-described electrode according to the invention in conjunction with the execution of a micromovement of the electrode perpendicular to the feed direction of the electrode ensures, on the one hand, a forced uniform electrolyte flow and electrolyte exchange in narrow gaps. On the other hand, it prevents the porosity of the electrode, particularly the porosity of the electrode in the area of the machining range, from being reproduced on the workpiece to be machined. The micromovement is advantageously executed with an amplitude that approximately corresponds to the pore size or the diameter of the openings.

In yet another method according to the invention for electrochemical machining of a workpiece using an electrochemical machining process with an electrode as described above, at least one tilting movement of the electrode is executed perpendicularly to the feed direction of the electrode while the electrode is fed in the direction of the workpiece to be machined. This makes it possible not only to achieve a uniform electrolyte flow and electrolyte exchange but also to exchange the electrolyte more rapidly and in greater quantities, so that even large areas of workpieces may be readily machined.

In yet another method according to the invention for electrochemical machining of a workpiece using an electrochemical machining process with an electrode as described above, two electrodes on opposite sides are used, which are fed toward the workpiece to be machined, such that the workpiece is between the electrodes. Aside from the forced uniform electrolyte flow and the sufficiently large electrolyte exchange, this method makes it possible to compensate the electrolyte pressure, such that elastic bonding of the workpiece to be machined is reliably prevented. The two opposite electrodes can be fed toward the workpiece at a predefined angle, enabling the machining of workpieces with different geometries on the top and bottom sides. The slope angles of the electrodes relative to the machining surfaces can range between 5° and 75°.

In yet another advantageous embodiment of the method according to the invention, the electrolyte is added in pulses. This enables a precise dosing of the required electrolyte quantity.

The electrode according to the invention is used, inter alia, in an electrochemical machining process with a gap width between the electrode and the workpiece to be machined of less than 250 μm. The electrode according to the invention is furthermore used to produce engine components made of nickel-based or titanium-based alloys, particularly for producing blade profiles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for electrochemically machining a workpiece using an electrochemical machining process, comprising the steps of:
    flowing an electrolyte through perviousnesses in an electrode such that a uniform electrolyte flow occurs at a surface of the electrode in a machining range of the electrode;
    feeding the electrode in a direction of a workpiece to be machined; and
    micromoving the electrode in a direction perpendicular to the feed direction while the electrode is being fed in the direction of the workpiece, wherein the micromoving is executed with an amplitude that approximately corresponds to a pore size or a diameter of the perviousnesses.

2. The method according to claim 1, further comprising the step of forming areas of the electrolyte with different pressure gradients by different wall thicknesses of the electrode.

3. The method according to claim 1, further comprising the step of forming areas of the electrolyte with different pressure gradients by separately produced supply pressures of the electrolyte.

* * * * *